(12) United States Patent
Davies et al.

(10) Patent No.: US 9,715,037 B2
(45) Date of Patent: Jul. 25, 2017

(54) METHODS AND SYSTEMS FOR AN INTEGRATED ACOUSTIC AND INDUCTION LOGGING TOOL

(71) Applicant: HALLIBURTON ENERGY SERVICES, INC., Houston, TX (US)

(72) Inventors: Evan Lloyd Davies, Spring, TX (US); Dustin Riley Stubbs, Kingwood, TX (US); David Orlando Torres, Houston, TX (US)

( * ) Notice: Subject to any disclaimer, the term of this patent is extended or adjusted under 35 U.S.C. 154(b) by 0 days.

(21) Appl. No.: 14/771,776

(22) PCT Filed: Mar. 28, 2013

(86) PCT No.: PCT/US2013/034371
§ 371 (c)(1),
(2) Date: Aug. 31, 2015

(87) PCT Pub. No.: WO2014/158164
PCT Pub. Date: Oct. 2, 2014

(65) Prior Publication Data
US 2016/0018561 A1    Jan. 21, 2016

(51) Int. Cl.
*G01V 11/00* (2006.01)
*G01V 1/28* (2006.01)
(Continued)

(52) U.S. Cl.
CPC ........ *G01V 11/007* (2013.01); *E21B 47/0905* (2013.01); *E21B 47/101* (2013.01);
(Continued)

(58) Field of Classification Search
CPC .... E21B 47/0905; E21B 47/101; E21B 49/00; E21B 49/08; G01V 3/28; G01V 1/44;
(Continued)

(56) References Cited

U.S. PATENT DOCUMENTS

| 2,190,686 A | 2/1940 | Slichter |
| 4,472,684 A | 9/1984 | Schuster |

(Continued)

FOREIGN PATENT DOCUMENTS

| WO | 2011/136760 | 11/2011 |
| WO | 2014/158164 | 10/2014 |

OTHER PUBLICATIONS

PCT International Search Report and Written Opinion, dated Jun. 26, 2013, Appl No. PCT/US2013/034371, "Methods and Systems for an Integrated Acoustic and Induction Logging Tool", filed Mar. 28, 2013, 13 pgs.

(Continued)

*Primary Examiner* — Daniel L Murphy
(74) *Attorney, Agent, or Firm* — Iselin Law PLLC; Benjamin Fite

(57) ABSTRACT

An integrated acoustic and induction logging tool enables efficient logging operations and reduces logging string length. In some of the disclosed embodiments, an integrated acoustic and induction logging tool includes a mandrel compatible with acoustic logging operations and induction logging operations. The integrated acoustic and induction logging tool also includes an acoustic logging transducer set and an induction logging coil set, where a plurality of transducers of the acoustic logging transducer set are interspersed among a plurality of coils of the induction logging coil set along the mandrel. A related assembly method includes obtaining a mandrel compatible with acoustic logging and induction logging. The method also includes assembling an acoustic logging transducer set and an induction logging coil set along the mandrel, where a plurality of transducers of the acoustic logging transducer set are interspersed among a plurality of coils of the induction logging coil set along the mandrel.

21 Claims, 6 Drawing Sheets

(51) Int. Cl.
*E21B 47/09* (2012.01)
*E21B 47/10* (2012.01)
*G01V 3/28* (2006.01)
*E21B 49/00* (2006.01)
*E21B 49/08* (2006.01)
*G01V 1/40* (2006.01)
*G01V 1/44* (2006.01)
*G01V 1/52* (2006.01)

(52) U.S. Cl.
CPC ............ *E21B 49/00* (2013.01); *E21B 49/08* (2013.01); *G01V 1/40* (2013.01); *G01V 1/44* (2013.01); *G01V 1/52* (2013.01); *G01V 3/28* (2013.01); *G01V 11/00* (2013.01); *G01V 2200/16* (2013.01)

(58) Field of Classification Search
CPC .......... G01V 1/52; G01V 1/40; G01V 11/007; G01V 11/00; G01V 2200/16
USPC .......................................................... 367/25
See application file for complete search history.

(56) References Cited

U.S. PATENT DOCUMENTS

| | | |
|---|---|---|
| 6,791,469 B1 | 9/2004 | Rao et al. |
| 2002/0062992 A1 | 5/2002 | Fredericks et al. |
| 2004/0001388 A1 | 1/2004 | Kriegshauser et al. |
| 2005/0162251 A1 | 7/2005 | Davies et al. |
| 2008/0265894 A1 | 10/2008 | Snyder et al. |
| 2011/0180327 A1 | 7/2011 | Bittar et al. |

OTHER PUBLICATIONS

EP Extended Search Report, dated Aug. 19, 2016, Appl No. 13880573.4, "Methods and Systems for an Integrated Acoustic and Induction Logging Tool," Filed Mar. 28, 2013, 9 pgs.

CA Examination Report, dated Sep. 23, 2016, Appl No. 2,901,089, "Methods and Systems for an Integrated Acoustic and Induction Logging Tool," Filed Mar. 28, 2013, 4 pgs.

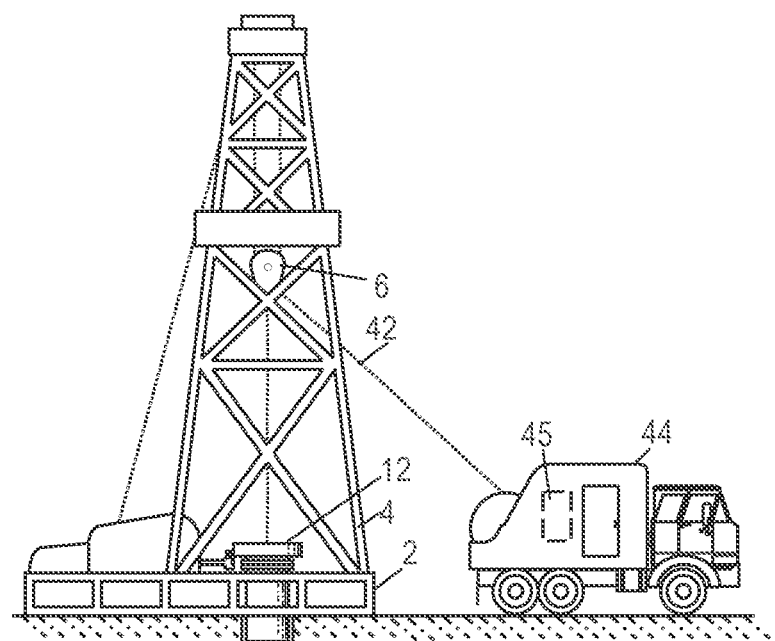
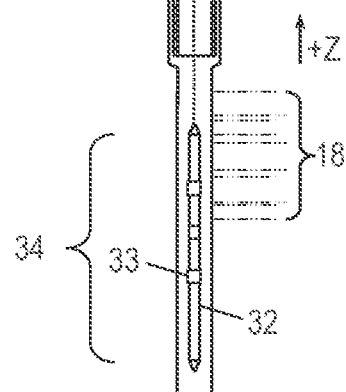
FIG. 1
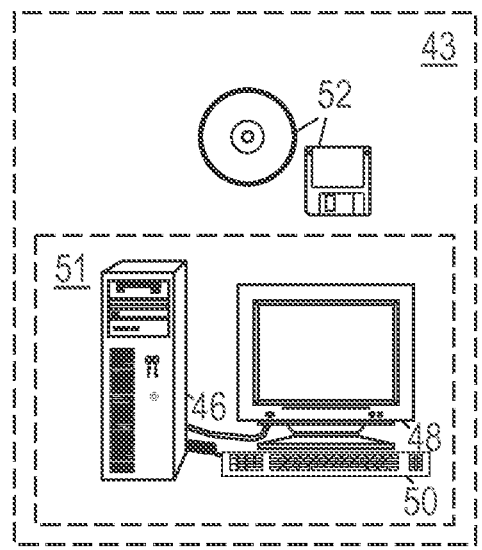
FIG. 2

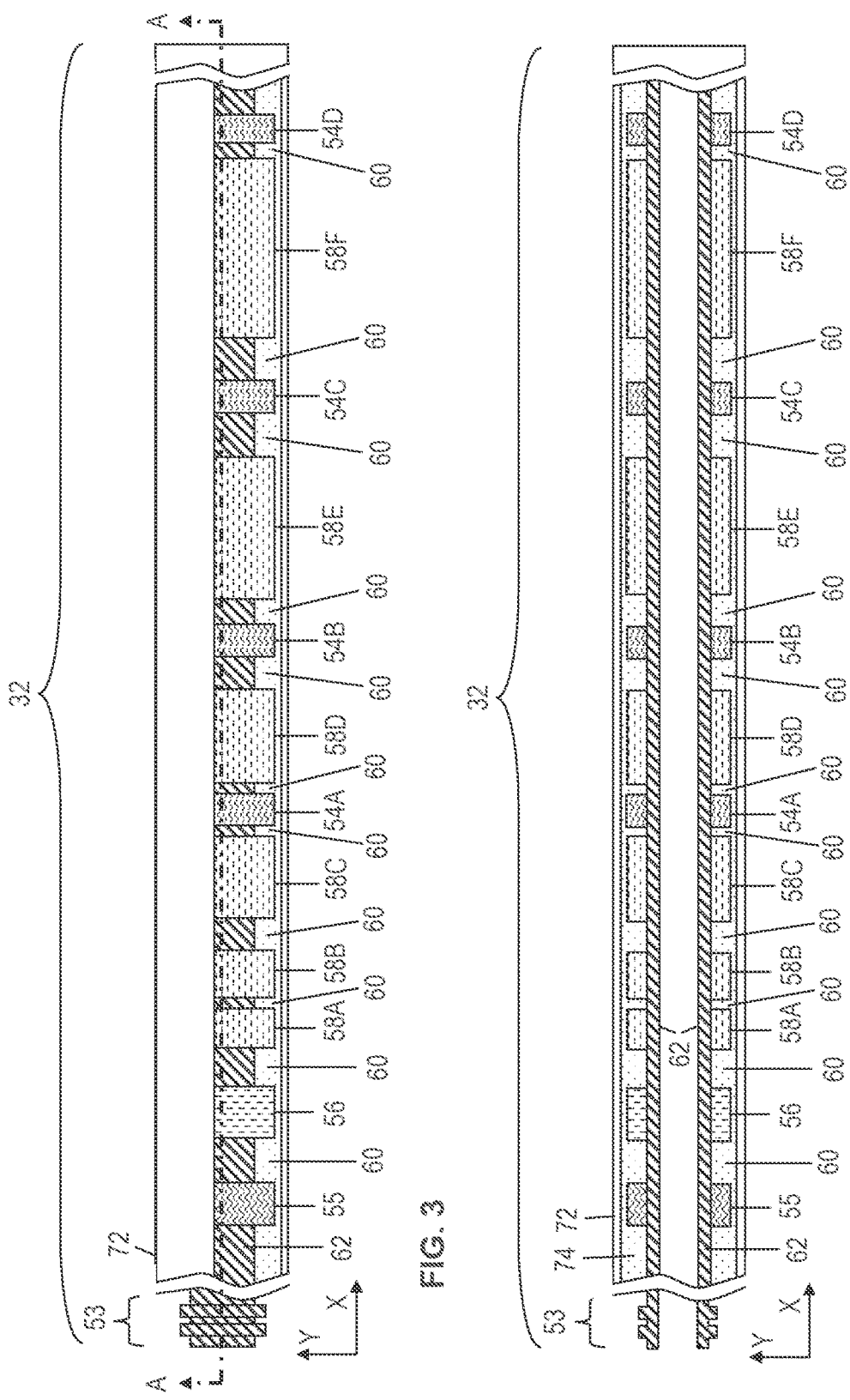

METHODS AND SYSTEMS FOR AN INTEGRATED ACOUSTIC AND INDUCTION LOGGING TOOL

BACKGROUND

Modern oil field operations demand a great quantity of information relating to the parameters and conditions encountered downhole. Such information typically includes characteristics of the earth formations traversed by a borehole, and data relating to the size and configuration of the borehole itself The collection of information relating to conditions downhole, which commonly is referred to as "logging," can be performed by several methods including wireline logging and "logging while drilling" (LWD). In wireline logging, a probe or "sonde" is lowered into the borehole after some or the entire well has been drilled, and various parameters of the earth's formations are measured and correlated with the position of the sonde in the borehole as the sonde is pulled uphole. Meanwhile, in LWD, the drilling assembly includes sensing instruments that measure various parameters as a formation is being penetrated.

One type of logging, referred to as induction logging, measures the resistivity properties of formations by generating and measuring electrical currents and/or voltage potentials from which one determines formation resistivity. Another type of logging, referred to as acoustic logging, measures the acoustic properties of formations by transmitting an acoustic wave through the fluid in a well and surrounding elastic materials and then measuring the travel time, amplitude, or other attributes of reflected waves.

Acoustic logging and induction logging are typically performed by separate tool sections along a logging string. This arrangement increases the length of the logging string and does not allow simultaneous acoustic logging and induction logging of the same formation.

BRIEF DESCRIPTION OF THE DRAWINGS

Accordingly, there are disclosed herein integrated acoustic and induction logging tool systems and methods. In the drawings:

FIG. 1 shows an illustrative wireline logging environment.

FIG. 2 shows an illustrative computer system for managing logging operations.

FIG. 3 shows an illustrative integrated acoustic and induction logging tool.

FIG. 4 shows a cross-section of the integrated acoustic and induction logging tool of FIG. 4.

Figure 5:
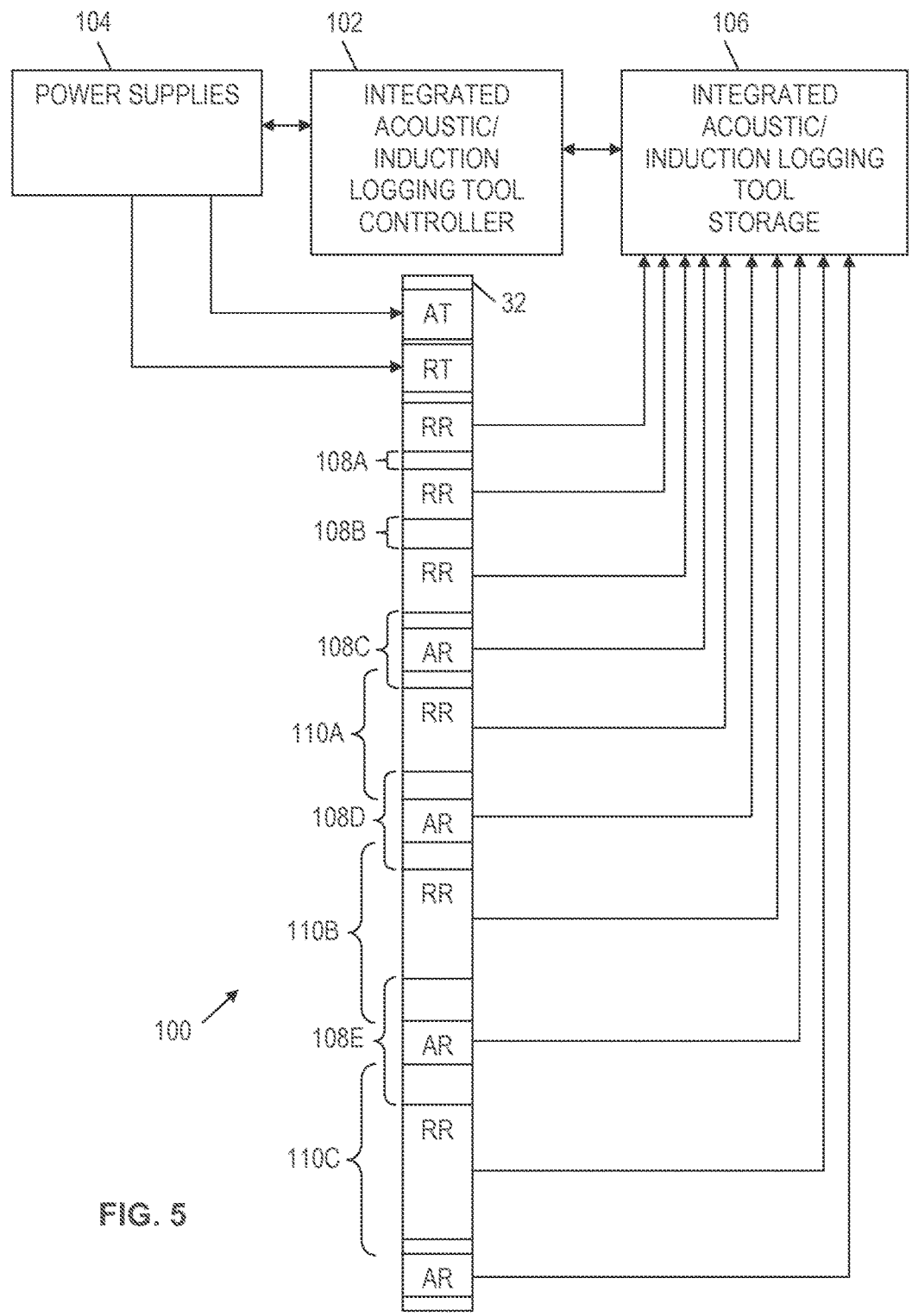
FIG. 5 shows an illustrative logging system with the integrated acoustic and induction logging tool of FIGS. 3 and 4.

The drawings show illustrative embodiments that will be described in detail. However, the description and accompanying drawings are not intended to limit the invention to the illustrative embodiments, but to the contrary, the intention is to disclose and protect all modifications, equivalents, and alternatives tailing within the scope of the appended claims.

NOMENCLATURE

Certain terms are used throughout the following description and claims to refer to particular system components. This document does nest intend to distinguish between components that differ in name but not function. The terms "including" and "comprising" are used in an open-ended fashion, and thus should be interpreted to mean "including, but not limited to . . . ".

The term "couple" or "couples" is intended to mean either an indirect or direct electrical, mechanical, or thermal connection. Thus, if a first device couples to a second device, that connection may be through a direct connection, or through, an indirect connection via other devices and connections. Conversely, the term "connected" when unqualified should be interpreted to mean a direct connection. For an electrical connection, this term means that two elements are attached via an electrical path having essentially zero impedance.

DETAILED DESCRIPTION

Disclosed herein are logging systems and methods that utilize an integrated acoustic and induction logging tool, in some embodiments, an integrated acoustic and induction logging tool includes an acoustic logging transducer set and an induction logging coil set, where at least some components of the acoustic logging transducer set and the induction logging coil set are interspersed along the length of the integrated, acoustic and induction logging tool. The control electronics for an integrated acoustic and induction logging tool may be consolidated and may be managed by a logging operator and/or a computer program.

FIG. 1 shows an illustrative wireline logging environment, in which a drilling platform 2 supports a derrick 4 having a traveling block 6 for raising and lowering a wireline logging string 34 to perform logging operations. The wireline logging string 34 (i.e., a sensing instrument sonde) is suspended by a cable or wireline 42 having conductors for transporting power to the logging string 34 and for enabling communications between the logging string 34 and the surface. As shown, the logging string 34 includes integrated acoustic and induction logging tool 32. In some embodiments, an adaptor 33 connects the integrated acoustic and induction logging tool 32 to other tools or sections of the wireline logging tool 34. In the illustrated logging environment of FIG. 1, the integrated acoustic and induction logging tool 32 is positioned at the bottom of the logging string 34. In such case, the integrated acoustic and induction togging tool 32 need not support the weight of other tools or sections of the logging string 34.

A logging facility 44 collects measurements from the logging string 34, and includes computing facilities 45 for managing logging operations and storing/processing measurements gathered by the logging string 34. For the logging environments of FIG. 1, measured parameters can be recorded and displayed its the form of a log, i.e., a two-dimensional graph showing the measured parameter as a function of tool position or depth. In addition to making parameter measurements as a function of depth, some logging tools also provide parameter measurements as a function of rotational angle.

FIG. 2 shows an illustrative computer system 43 for managing logging operations. The computer system 43 may correspond to the computing facilities 45 of logging facility 44 or a remote computing system. The computer system 43 may include wired or wireless communication interfaces in communication with the logging string 34 to citable automated or operator-assisted management of a logging process. As shown, the computer system 43 comprises user workstation 51, which includes a general processing system 46. The general processing system 46 is preferably configured by software, shown in FIG. 2 in the form of removable, non-transitory (i.e., non-volatile) information storage media 52. The software may manage logging operations including logging string assembly, analyzing borehole conditions, detecting logging conflicts or defects, and dynamically adjusting logging string assembly and/or logging operations based on integrated acoustic/induction tool options. In some case, the software may be downloadable software accessed through a network (e.g., via the Internet). As shown, general processing system 46 stay couple to a display device 48 and a user-input device 50 to enable a human operator to interact with system software stored by computer-readable media 52.

In some embodiments, software executing on the user workstation 51 presents a logging management interface with integrated acoustic/induction tool options to the riser. As an example, the logging management interface may enable an operator to select from different, logging plans that will be performed or to update logging plans that are being performed in accordance with integrated acoustic/induction tool options. In alternative embodiments, the performance of logging plans and updated logging plans based on integrated acoustic/induction tool options is automated. As an example, a preliminary togging plan may be based on an integrated acoustic/induction sensor man. However, if logging defects are detected, an updated logging plan may be selected by an operator or computer program to enable efficient logging operations.

Stated in another fashion, various logging management methods described herein can be implemented in the form of software that can be communicated to a computer or another processing system on an information storage medium such as an optical disk, a magnetic disk, a flash memory, or other persistent storage device. Alternatively, such software may be communicated to the computer or processing system via a network or other information transport medium. The software may be provided in various forms, including interpretable "source code" form and executable "compiled" form. The various operations carried out by the software as described herein may be written as individual functional modules (e.g., "objects", functions, or subroutines) within the source code.

FIG. 3 shows a cut away view through part of an outer layer 72 of an illustrative integrated acoustic and induction logging tool 32. The integrated acoustic and induction logging tool 32 includes a mandrel 62 with a threaded section 53 that enables the tool 32 to be attached to another tool or section of a wireline logging tool string. In some embodiments, an adaptor (e.g., adaptor 33 of FIG. 1) may facilitate such attachment. As shown, the integrated acoustic and induction logging tool 32 comprises an acoustic logging transmitter 55 and a set of acoustic logging receivers 54A-54D arranged along the mandrel 62. The acoustic logging transmitter 55 and the acoustic logging receivers 54A-54D are sometimes referred to herein as acoustic logging transducers, and are components of an acoustic logging transducer set that includes at least one transmitter and multiple receivers.

The integrated acoustic and induction logging tool 32 also includes an induction logging transmitter 56 and a set of induction logging receivers 58A-58F arranged along the mandrel 62. The induction logging transmitter 56 and induction togging receivers 58A-58F are sometimes referred to herein as induction logging coils, and are components of an induction logging coil set that includes at least one transmitter and multiple receivers. In the embodiment of FIG. 3, the induction logging coils and the acoustic logging transducers of the integrated acoustic and induction logging tool 32 are separated by spacings 60, which may be associated with a spacer material, open space, or fluid. Further, in the illustrated embodiment of FIG. 3, the induction logging coils and. the acoustic logging transducers of the integrated acoustic and induction logging tool 32 are associated with rings. In alternative embodiments, non-ring transducers and/or coils may be employed.

For the integrated acoustic and induction logging tool 32, the number of acoustic logging transducers (transmitters or receivers) in the acoustic logging transducer set may vary. Similarly, the number of induction logging coils (transmitters or receivers) in the induction logging coil set may vary. Regardless of the number of acoustic logging transducers and induction logging coils, disclosed embodiments intersperse at least some induction logging coils among a plurality of acoustic logging transducers. For example, in illustrated embodiment of FIG. 3, some receiver coils 58A-58C are adjacent to each other (with spacings 60 in between) while other receiver coils 58D-58F are separated from each other by acoustic logging transducers. As used herein, coils or transducers that are "adjacent." to each other may be separated by empty space, fluid, or passive objects, but do not have other acoustic or induction components between them. As an example, receiver coil 58A is adjacent to receiver coil 58B as there is no other acoustic or induction component, between them. Meanwhile, receiver coil 58C is not adjacent to receiver coil 58D because acoustic logging receiver 54A is between them. Similarly, receiver coils 58D and 58F are not adjacent as they are separated by acoustic wave receiver 54B, and so on.

Regardless of the number of transducers in art acoustic logging transducer set and she number of coils in an induction logging coil set, the combined sets may be understood to have two opposite ends. For example, FIG. 3 shows acoustic logging transmitter 55 and acoustic logging receiver 54D at opposite ends of the combined sets. In other words, for the integrated acoustic and induction logging tool 32 of FIG. 3, there is no transducer or coil to the left of acoustic logging transmitter 55. Similarly, there is no transducer or coil to the right of the acoustic logging receiver 54D. Other arrangements are also possible, where particular transducers or coils are proximate the same end or are proximate opposite ends of the combined sets. In some embodiments, as in FIG. 3, the acoustic logging transmitter 55 and the induction logging transmitter 56 are positioned proximate one of the two opposite ends of the combined sets. In an alternative embodiment, the acoustic logging transducer set may include an acoustic logging transmitter proximate each of the two opposite ends of the combined sets.

In the illustrated embodiment of FIG. 3, the spacing between induction logging receivers 58A-58F increases along the X axis in proportion to the distance of the induction logging receivers 58A-58F from the induction logging transmitter 56. More specifically, the spacing between induction logging receiver 58B and 58C is greater than the spacing between induction logging receiver 58A and 58B, and so on. The spacing between acoustic logging receivers 54A-54D also increases along the X axis in proportion to the distance of the acoustic logging receivers 54A-54D from the acoustic logging transmitter 55. More specifically, the spacing between acoustic logging receivers 54B and 54C is greater than the spacing between acoustic logging receivers 54A and 54B, and so on. Further, the width of the induction logging receivers 58A-58F increases along the X axis in proportion to the distance of the induction logging receivers 58A-58F from the induction logging transmitter 56. More specifically, the width of induction logging receiver 58A is smallest, white the width of induction logging receiver 58F is largest. Meanwhile, the width of the acoustic logging receivers 54A-54D is shown to stay the same along the X axis regardless of the distance of the acoustic logging receivers 54A-54D frost the acoustic logging transmitter 55.

In alternative embodiments, the width of the induction logging receivers 58A-58F and the spacings 60 may vary from the illustrated embodiment. Further, the spacing between and/or the position of the acoustic logging receivers 54A-54D and the induction logging receivers 58A-58F may vary from the illustrated embodiment. The spacing and/or width of the acoustic logging receivers 54A-54D and the induction logging receivers 58A-58F may vary, for example, due to the use of multiple acoustic logging transmitters 55 for the integrated acoustic and induction logging tool 32. In one example, an integrated acoustic and induction logging tool may include acoustic logging transmitters at opposite ends of the tool.

FIG. 4 shows a cross-section of the integrated acoustic and induction logging tool 32 of FIG. 3 along line A. In FIG. 4, the mandrel 62 of the integrated acoustic and induction logging toot 32 supports an arrangement of acoustic and togging components including the acoustic togging transmitter 55, the induction logging transmitter 56, the acoustic logging receivers 54A-54D, and the induction logging receivers 58A-58F. In some embodiments, the mandrel 62 is a hollow fiberglass body with a connector section 53 (see also FIG. 3) formed at one end.

The various transducers and coils are separated by spacings 60 as previously discussed. In some embodiments, the position/width, of spacings 60 or related spacers along the mandrel 62 is determined before the acoustic logging transmitter 55, the induction logging transmitter 56, the acoustic logging receivers 54A-54D, and the induction logging receivers 58A-58F are arranged along the mandrel 62. In alternative embodiments, the position/width of spacings 60 or related spacers along the mandrel 62 is determined after the acoustic logging transmitter 55, the induction logging transmitter 56, the acoustic logging receivers 54A-54D, and the induction logging receivers 58A-58F are arranged along the mandrel 62.

Once the acoustic logging transducer set and the induction logging coil set axe in position along the mandrel 62, an outer layer 72 is wrapped around or is otherwise placed over these components. In some embodiments, the mandrel 62 and the outer layer 72 are formed from fiberglass or another material with slow direct arrival characteristics compatible with acoustic logging operations. Further, the mandrel 62 and the outer layer 72 are non-conductive to enable induction logging operations. To protect against pressure-based compression of the integrated acoustic and induction logging tool 32 in a well bore environment, a fluid 74 (e.g., oil or the like) fills any space between the mandrel 62 and Ore outer layer 72.

In some embodiments, the acoustic logging transducers and induction logging coils described herein are integrated with their respective rings. For example, the acoustic logging transducers and induction logging coils may be included with corresponding rings as a pre-assembled package. Such pre-assemble packages are then put into their places along mandrel 62. In alternative embodiments, rings are machined, to include art acoustic logging transducer slot or art induction logging coil slot before being moved onto the mandrel 62, but corresponding acoustic logging transducers and induction logging coils are put into place after their respective rings are in place along the mandrel 62. In another alternative embodiment, acoustic logging transducer slots and induction logging coil slots are machined into their corresponding rings after the rings are put into their places along the mandrel 62, Underneath the acoustic logging transducers and induction logging coils respective openings may extend to an interior cavity of mandrel 62 to enable power supply and/or sense cables (not shown in FIG. 4, but represented in FIG. 5) to reach the acoustic logging transducers and induction logging coils. Such power or sense cables may be connected to the acoustic logging transducers and induction logging coils after they are already in place along the mandrel 62. In alternative embodiments, power or sense cables are pre-connected to the acoustic logging transducers and induction logging coils before they are put in place along the mandrel 62.

FIG. 5 shows an illustrative logging system 100 with integrated acoustic and induction logging tool 32. In system 100, the integrated acoustic and induction logging tool 32 couples to power supplies 104 and integrated acoustic/induction logging tool storage 106. The power supplies 104 and integrated acoustic/induction logging tool storage 106 also couple to an integrated acoustic/induction logging tool controller 102, which directs logging operations of the logging system 100. In some embodiments, the controller 102 corresponds to a computer system (e.g., computer system 43 of FIG. 2) with a processor and memory with software instructions. When executed by a processor, the software instructions enable the computer system to direct. the logging operations of the logging system 100. Further, a controller or computer system with instructions may be employed to complete one or more of the methods steps described in method 200 of FIG. 7 or method 300 of FIG. 8.

As shown, integrated acoustic and induction logging tool 32 includes an acoustic logging transmitter (AT), four acoustic logging receivers (ARs), an induction togging transmitter (RT), and six induction togging receivers (RRs). The transmitters and receivers shown are components of an acoustic logging transducer set and an induction logging coil set as described herein.

In FIG. 5, the AT and RT are coupled to power supplies 104 via power cabling. Meanwhile, the ARs and RRs are coupled to integrated acoustic/induction logging tool storage 106 via sense cabling. In operation, the power supplies 104 provide a predetermined power level and frequency to the AT to citable acoustic waves to be generated for acoustic logging operations. During acoustic logging operations, the ARs generate a voltage corresponding to pressure and/or movement due to acoustic waves reflected by the surrounding formation. These voltages are stored by the integrated acoustic/induction logging tool storage 106 and can be used to generate an acoustic log of the surrounding formation.

The power supplies 104 also provide a predetermined power level and frequency to the RT to enable current injections into the surrounding formation for induction logging operations. In some embodiments, the RT injects alternating current into the surrounding formation through outer layer 72 of the integrated acoustic and induction logging tool 32. During induction logging operations, the RRs sense a voltage difference between different areas of the surrounding formation. Because the current injected into the formation in known, the resistivity of the formation between different RRs can be calculated and used to generate an induction log of the surrounding formation. With the integrated acoustic and induction logging tool 32 of system 100, acoustic logging operations and induction logging operations for the same formation, may be simultaneous.

In system 100, the integrated acoustic/induction logging tool controller 102 stores or receive a logging program and directs the power supplies 104 accordingly. Further, the integrated, acoustic/induction logging tool controller 102 monitors data collected by the integrated acoustic/induction logging tool storage 106 and identifies logging defects. In response, the integrated, acoustic/induction logging tool controller 102 updates the logging operations. In alternative embodiments, the integrated acoustic/induction logging tool controller 102 receives commands from a logging operator and directs the power supplies 104 accordingly. Further, the integrated acoustic/induction Jogging toot controller 102 may toward logging data and/or alerts to an operator interface (not shown).

FIG. 5 also shows spacings 108A-108E between RRs and spacings 110A-110C between ARs. As shown, spacing 108A is closest to the RT and is the smallest of spacings 108A-108E, while spacing 108E is farthest from the RT and is largest. Similarly, spacing 110A is closest to the AT and Is smallest of spacings 110A-110C, while spacing 110C is farthest from the AT and is largest. The position of the AT, RT, ARs, RRs, spacings 108A-108E, and spacings 110A-110C may vary for different integrated acoustic/induction logging tools. Further, the width and quantity of the AT, RT, ARs, RRs, spacings 108A-108E, and spacings 110A-110C may vary for different integrated acoustic/induction logging tools. Further, the AT, RT, ARs, and RRs may vary with regard to their power level and frequency configuration for different integrated acoustic/induction logging tools.

For the logging system 100, acoustic logging operations and induction logging operations are performed simultaneously over the same formation using integrated acoustic and induction logging tool 32. Simultaneous acoustic logging and induction logging over the same region may improve logging results and allows collaboration of acoustic logging and induction togging for a formation in ways that are not possible with separated acoustic and induction togging tool sections. Further, the integrated acoustic and induction logging tool 32 reduces the total length of a logging string (e.g., togging string 34) compared to logging strings that employ separate sections for acoustic logging and induction logging.

Figure 6:
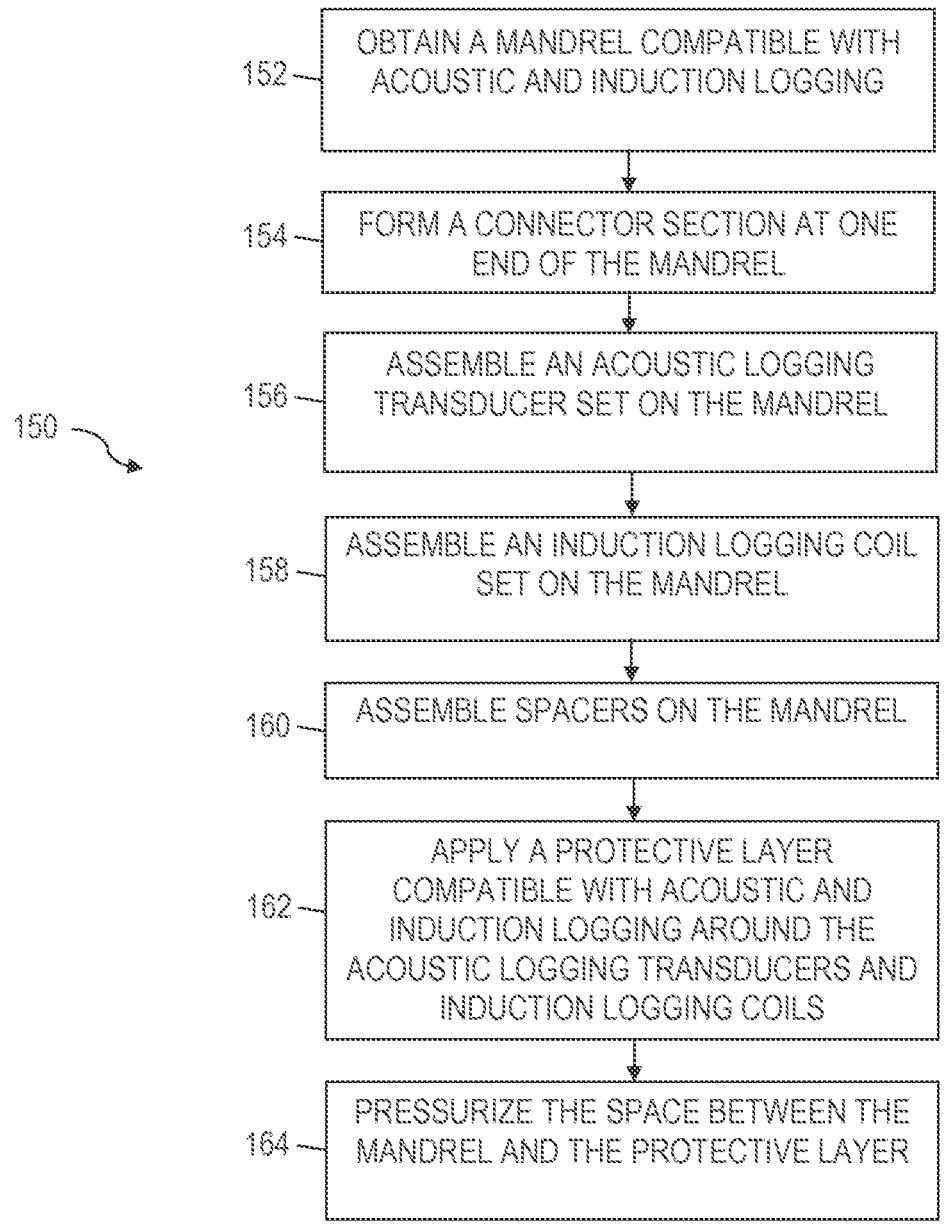
FIG. 6 shows a flowchart of an illustrative integrated acoustic and induction logging tool assembly method.

FIG. 6 shows a flowchart of an illustrative integrated acoustic and induction logging tool assembly method 150. As shown, the method 150 includes obtaining a mandrel compatible with acoustic and induction logging at block 152. As an example, the mandrel may correspond to a fiberglass material. A connector section is formed at one end of the mandrel at block 154. In some embodiments, the connector section corresponds to a threaded male connector section or threaded female connector section. At block 156, an acoustic logging transducer set is assembled on the mandrel. Further, an induction logging transmitter/receiver set is assembled on the mandrel at block 158. Spacers also may be assembled on the mandrel at block 160. In some embodiments, the steps 156, 158, and 160 are performed in a different order. At block 162, a protective layer compatible with acoustic and induction logging is applied around the acoustic logging transducers and the induction logging coils along the mandrel. The protective layer may correspond to outer layer 72 shown in FIG. 4 and may be a fiberglass material. At block 164, the space between the mandrel and the protective layer is pressurized (e.g., by injecting oil or another fluid).

Figure 7:
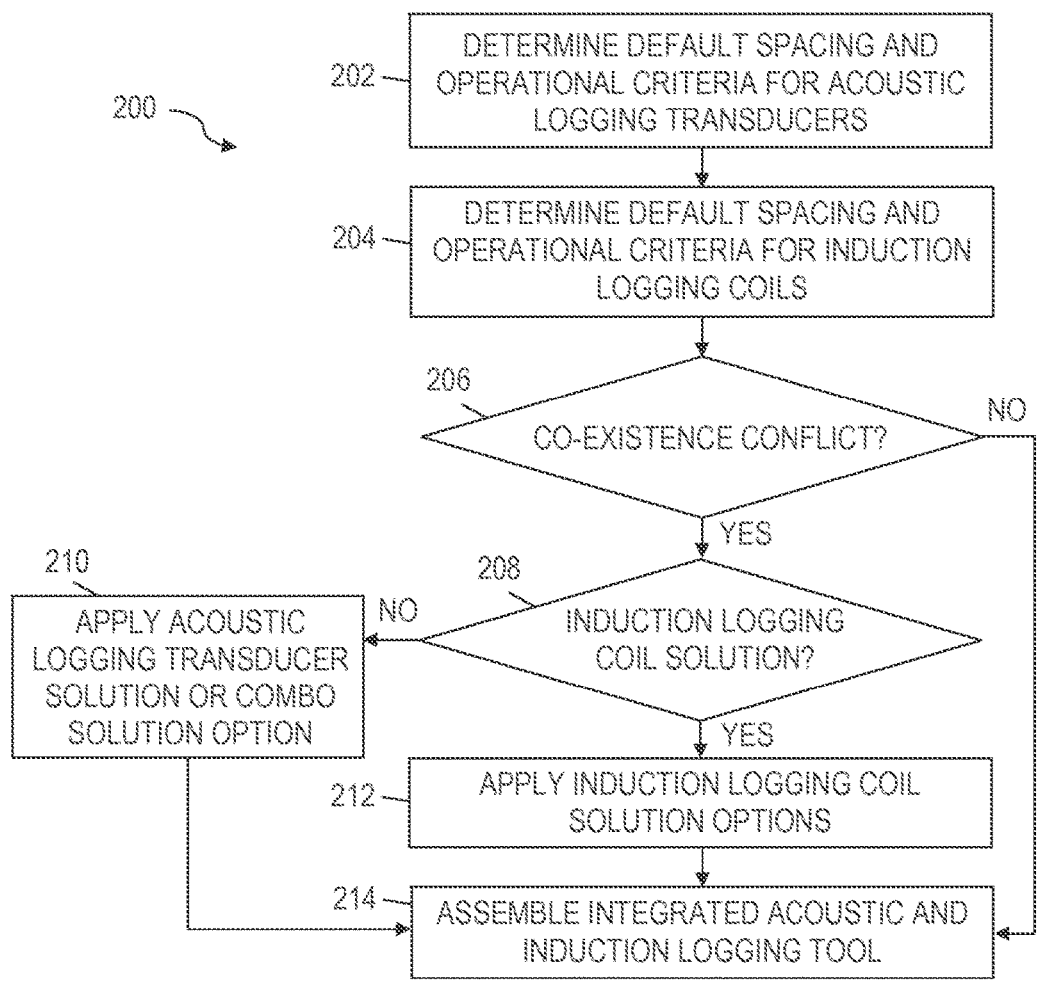
FIG. 7 shows a flowchart of another illustrative integrated acoustic and induction logging tool assembly method.

FIG. 7 shows a flowchart of another illustrative integrated acoustic and induction logging tool assembly method 200.

As shown, the method 200 comprises determining default spacing and operational criteria for acoustic logging transducers (block 202). At block 204, default spacing and operational criteria is determined for induction logging coils. If there is a co-existence conflict (determination block 206), a determination is made regarding whether an induction logging tool solution is possible (determination block 208). As used herein, the term "co-existence conflict" refers to a spacing or operational conflict between acoustic and induction logging technologies to be implemented on an integrated acoustic and induction logging tool. If there is a co-existence conflict (determination block 208), then induction logging coil solution options are applied at block 212. Such induction logging coil solution options may involve adjusting the number of induction logging cods, adjusting the spacing between induction logging coils, adjusting the width of induction logging coils, or adjusting related induction logging operations (power level, frequency, and/or timing). With the induction logging coil solution option(s) applied at block 212 to overcome the co-existence conflict, an integrated acoustic and induction logging tool is assembled (block 214). In some embodiments, the assembly method 150 of FIG. 6 may be used for the assembly step at block 214.

Returning to determination block 206, if there is no co-existence conflict, then the method 200 jumps to the assembly step of block 214 without applying the induction logging coil solution options of block 212 (i.e., the default criteria for acoustic logging transducers and induction logging coils is used). Further, if there is a co-existence conflict (determination block 206) and an induction logging coil solution is not available (determination block 208), then acoustic logging transducer solution options or combination (acoustic and induction) solution options axe applied at block 210. The acoustic logging transducer solution options may involve adjusting Ore number of acoustic logging transducers, adjusting the spacing between acoustic logging transducers, adjusting the size or materials of acoustic logging transducers, or adjusting related acoustic logging operations (power level, frequency, and/or timing). Once acoustic logging transducer solution options or combination solution options have been applied at block 210, an integrated acoustic and induction logging tool is assembled at block 214.

In method 200, changes to induction logging cods is favored over changes to acoustic logging transducers should there be a co-existence conflict. In alternative embodiments, changes to acoustic logging transducers may be favored over changes to induction logging coils should there be a co-existence conflict. The choice to maintain or change a particular acoustic logging transducer configuration or induction logging coil configuration when assembling an integrated acoustic and induction logging tool may be based on various criteria such as previous trial-and-error, logging criteria, customer preference, etc. Further, the method 200 may be performed by logging operators with knowledge of potential logging co-existence conflicts. Also, logging operators may have the assistance of logging management software that identifies co-existence conflicts before or during assembly of an integrated acoustic and induction logging toot. Thus, in some embodiments, a controller or computer system with instructions may be employed to complete or assist, an operator with one or more of the methods steps described in method 200.

Figure 8:
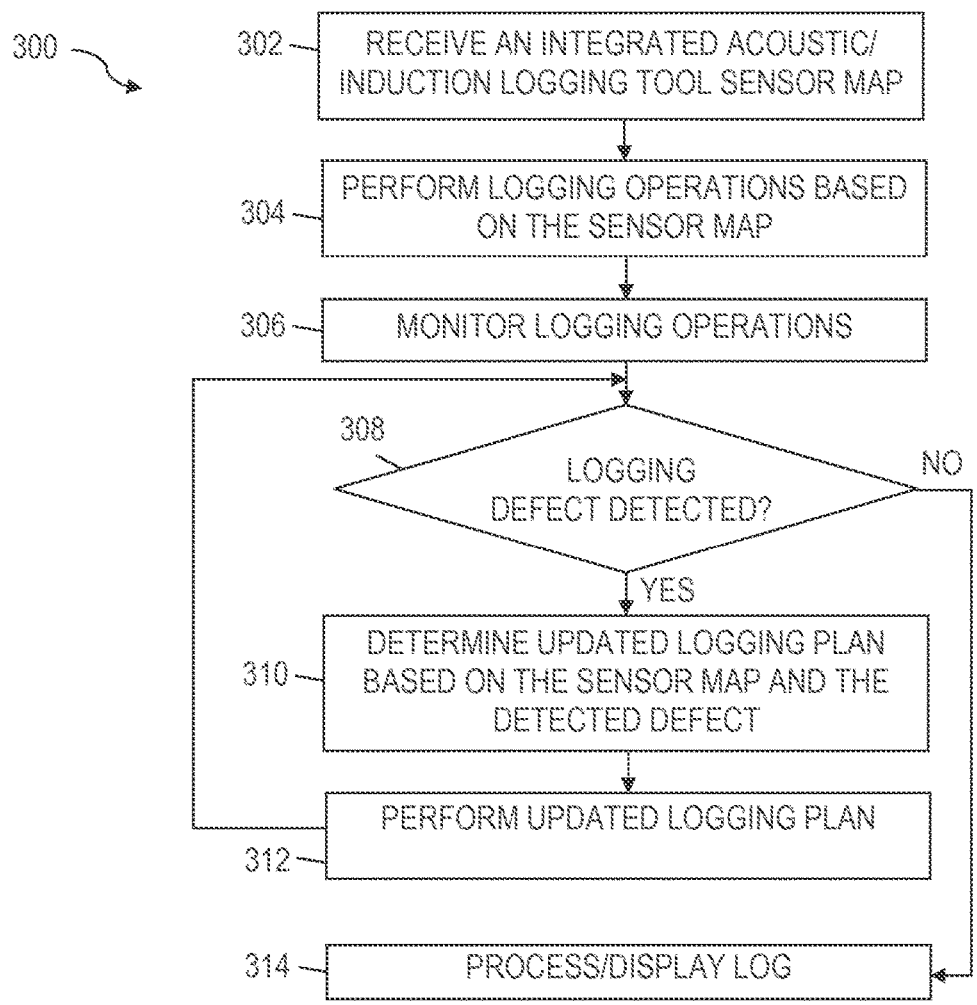
FIG. 8 shows a flowchart of an illustrative integrated acoustic and induction logging tool control method.

FIG. 8 shows a flowchart of an illustrative integrated acoustic and induction logging tool control method 300. The method 300 may be performed, for example, by a computer system that manages logging operations with or without involvement of a logging operator. As shown, the method 300 comprises receiving an integrated acoustic/induction logging tool sensor map at block 302. The sensor map may include the positions of acoustic logging transducers and induction logging coils of an integrated acoustic and induction logging tool. The mapping also may include the available operational frequency options and power level options for each acoustic logging and induction logging transmitter. At block 304, logging operations are performed based on the sensor map. In some embodiments, the logging operations include simultaneous acoustic logging operations and induction logging operations. In other embodiments, acoustic logging operations and induction logging operations are performed at different times. In either case, the logging operations are monitored at block 306. If a logging defect is detected (determination block 308), an updated logging plan is determined based on the sensor map and the detected defect (block 310). For example, the logging plan may adjust the power levels and/or frequencies for acoustic logging transmitters or for induction, logging transmitters. Further, the updated logging plan may gather voltage sense data from a different set of acoustic logging receivers or induction logging receivers. At block 312, the updated logging plan is performed and the method 300 returns to determination block 308.

As needed, the method 300 repeats the steps of blocks 308, 310, and 312 until it is determined that togging defects are not defected. In such case, the collected acoustic and induction logs are processed and/or displayed at block 314. In method 300, the logging detect detected at block 308 may be related to other logging tools or to borehole conditions. In such case, the logging operations for an integrated acoustic/induction logging tool may be adjusted to gather as much information about the formation as possible. The logging strategy of method 300 maximizes the amount of logging operations that are performed within a limited time window rising an integrated acoustic/induction logging tool by adjusting for logging defects and continuing with available logging operations.

Numerous variations and modifications will become apparent to those skilled in the art once the above disclosure is fully appreciated. For example, though the methods disclosed herein have been shown and described in a sequential fashion, at least some of the various illustrated operations may occur concurrently or in a different sequence, with possible repetition. It is intended that the following claims be interpreted to embrace all such variations, equivalents, and modifications.

What is claimed is:

1. A logging tool, comprising:
    a mandrel compatible with acoustic logging operations and induction logging operations;
    an acoustic logging transducer set with a plurality of acoustic receivers; and
    an induction logging coil set,
    wherein the plurality of acoustic receivers are interspersed among a plurality of coils of the induction logging coil set along the mandrel.

2. The logging tool of claim 1, wherein the induction logging coil set comprises a plurality of adjacent induction logging receivers positioned along the mandrel.

3. The logging tool of claim 1, wherein the acoustic logging transducer set comprises an acoustic logging transmitter, wherein the induction logging coil set comprises an induction logging transmitter, and wherein the induction logging transmitter and the acoustic logging transmitter are adjacent to each other along the mandrel.

4. The logging tool of claim 3, wherein the sets arranged along the mandrel form two opposite ends, and wherein the induction logging transmitter and the acoustic logging transmitter are positioned proximate one of the two opposite ends.

5. The logging tool of claim 1, wherein the sets arranged along the mandrel form two opposite ends, and wherein the acoustic logging transducer set comprises an acoustic logging transmitter proximate each of the two opposite ends.

6. The logging tool of claim 1, wherein the induction logging coil set comprises a plurality of induction logging receivers, and wherein spacing between adjacent induction logging receivers increases in proportion to an induction logging receiver's distance from an induction logging transmitter.

7. The logging tool of claim 1, wherein the induction logging coil set comprises a plurality of induction logging receiver rings, and wherein width of the induction logging receiver rings increases in proportion to an induction logging receiver ring's distance from an induction logging transmitter.

8. The logging tool of claim 1, further comprising a protective layer surrounding components of the acoustic logging transducer sets and the induction logging coil set.

9. The logging tool of claim 8, wherein the mandrel and the protective layer comprise fiberglass.

10. The logging tool of claim 1, further comprising a controller coupled to an acoustic logging transmitter of the acoustic logging transducer set and to an induction logging transmitter of the induction logging coil set, wherein the controller directs the acoustic logging transmitter and the induction logging transmitter to perform simultaneous logging operations on a formation.

11. The logging tool of claim 1, wherein the mandrel comprises a unitary non-conductive body on which the plurality of acoustic receivers are interspersed among a plurality of coils of the induction logging coil set.

12. A logging string, comprising:
    a wireline; and
    an integrated acoustic and induction logging tool coupled to the wireline, wherein the integrated acoustic and induction logging tool comprises a mandrel with a plurality of acoustic receivers for acoustic logging interspersed among a plurality of coils for induction logging.

13. The logging string of claim 12, further comprising a controller coupled to the integrated acoustic and induction logging tool, wherein the controller directs the integrated acoustic and induction logging tool to simultaneously perform acoustic logging and induction logging for a formation.

14. A method, comprising:
    obtaining a mandrel compatible with acoustic logging and induction logging;
    assembling an acoustic logging transducer set along the mandrel; and
    assembling an induction logging coil set along the mandrel, wherein a plurality of acoustic receivers of the acoustic logging transducer set are interspersed among a plurality of coils of the induction logging coil set along the mandrel.

15. The method of claim 14, further comprising assembling a plurality of adjacent induction logging coils of the induction logging coil set along the mandrel.

16. The method of claim 14, wherein assembling the acoustic logging transducer set and assembling the induction logging coil set comprises assembling an induction logging transmitter and an acoustic logging transmitter adjacent to each other along the mandrel.

17. The method of claim 14, wherein the sets assembled along the mandrelform two opposite ends, and wherein the acoustic logging transducer set comprises an acoustic logging transmitter proximate each of the two opposite ends.

18. The method of claim 14, wherein assembling the acoustic logging transducer set along the mandrel comprises adjusting an arrangement of transducers of the acoustic logging transducer set from a default configuration to resolve a co-existence conflict with the induction logging coil set.

19. The method of claim 14, wherein assembling the induction logging coil set along the mandrel comprises adjusting an arrangement of coils of the induction logging coil set from a default configuration to resolve a co-existence conflict with the acoustic logging transducer set.

20. The method of claim 14, further comprising applying a protective layer around the acoustic logging transducer set and the induction logging coil set, wherein the mandrel and the protective layer comprise fiberglass.

21. The method of claim 14, wherein assembling an induction logging coil set comprises assembling a plurality of induction logging receiver rings along the mandrel, wherein spacing between adjacent induction logging receiver rings increases in proportion to an induction logging receiver ring's distance from a transmitter coil, and wherein width of the induction logging receiver ring increases in proportion to an induction logging receiver ring's distance from a transmitter coil.

* * * * *